June 24, 1947. M. G. NICHOLSON, JR 2,422,975
REMOTE CONTROL OF DEFLECTION IN CATHODE RAY TUBES
Filed March 28, 1944
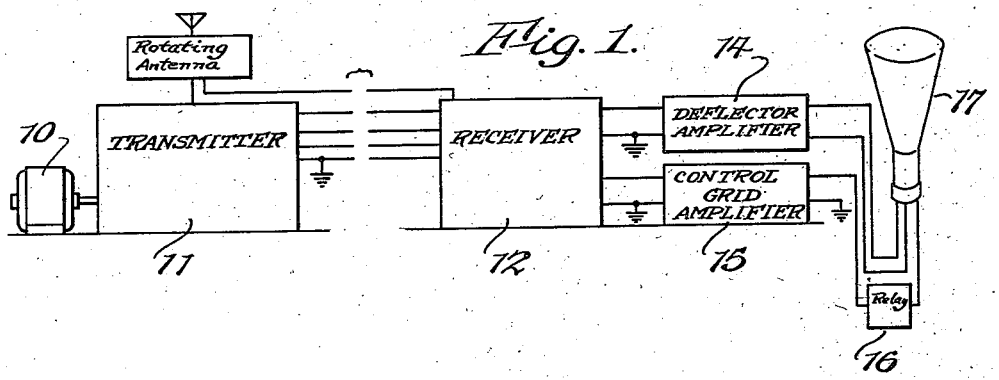
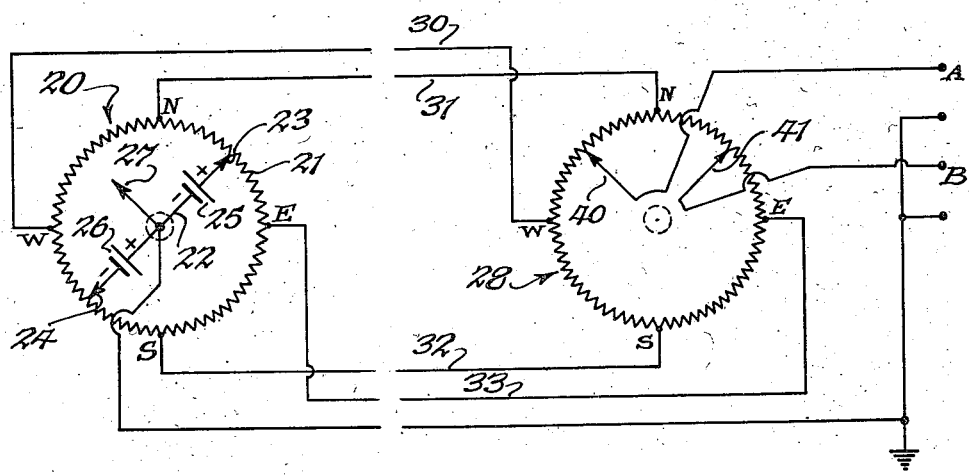
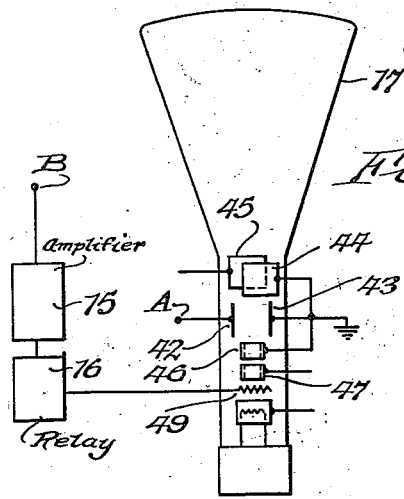
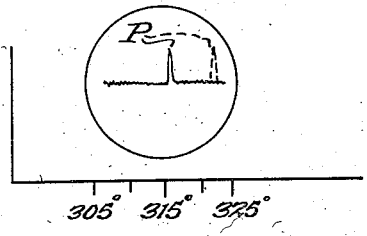
INVENTOR
Madison G. Nicholson, Jr.
BY
C. G. Trouton
ATTORNEY Patented June 24, 1947

2,422,975

UNITED STATES PATENT OFFICE 2,422,975

REMOTE CONTROL OF DEFLECTION IN CATHODE-RAY TUBES

Madison G. Nicholson, Jr., Snyder, N. Y., assignor to Colonial Radio Corporation, Buffalo, N. Y.

Application March 28, 1944, Serial No. 528,395

9 Claims. (Cl. 250—11)

This invention relates to a method and apparatus for remotely controlling the deflection in a cathode ray tube, particularly in respect of angles or sectors to be observed; and while capable of application for a number of purposes, is of particular utility and value in connection with radar apparatus.

In such apparatus, it is known that signals may be transmitted from a rotating antenna array rotating at a predetermined speed in such a manner that signals are sent out progressively in every direction. If the waves which constitute these signals strike a conducting or metallic object such as a ship, an airplane in flight, or even tall buildings, they are reflected back, a phenomenon sometimes termed "radio echo."

One may employ a receiver to "listen" to this radio echo by observing it on an oscilloscope; and if the receiving antenna is located at the same position as the transmitter and has the same directional characteristics and operates in synchronism with it, it is possible to determine the bearing and the distance of the object which reflects the wave. In effect the observer "looks" around the entire horizon circle at the same rate at which the transmitting antenna array rotates.

It is frequently desirable, however, instead of having one observer continuously observing the entire 360° of the horizon, to observe continuously a small sector; for example, to plot the course and speed of an airplane some miles away, and to follow this particular airplane on its course.

In accordance with my invention, I provide a relatively simple and reliable means by which this may be done; that is, while the transmitting antenna continues to rotate through 360° while sending out its signals, the receiver and cathode ray tube may be so controlled that the observer will look at only one part of the horizon; for example, that occurring within a compass bearing from 305°, say, to 325°, or that within 310° to 320°, depending on what is to be observed.

By the use of apparatus according to this invention, should the object observed move out of this area, it is possible by a simple adjustment of the apparatus to follow the object and to keep its indication centered upon the screen of the cathode ray tube. Accordingly, among the objects of my invention my be mentioned the following:

To provide simple and reliable apparatus for selecting any desired sector of the horizon for continuous observation.

To provide simple apparatus by means of which the deflection of the cathode ray may be controlled and maintained centered geographically in any particular sector.

To provide means which may be remotely situated with respect to the cathode ray tube for executing such control.

Still other objects of my invention will be apparent from the specification.

In this application I have particularly pointed out and distinctly claimed the part, improvement, or combination which I claim as my invention or discovery, and I have explained the principles thereof and the best mode in which I have contemplated applying those principles, so as to distinguish my invention from other inventions.

In the drawing,

Fig. 1 represents diagrammatically a radar system embodying my invention.

Fig. 2 shows detailed views of the control apparatus and circuits in accordance with this invention.

Fig. 3 is a diagrammatic view of a cathode ray tube showing one manner of connecting the same to the apparatus shown in Fig. 2.

Fig. 4 is a sketch indicating how the screen of the cathode ray tube may appear with respect to the sector being observed.

Referring now more particularly to Fig. 1, 11 indicates generally the transmitter of a locator system, which may comprise all of the necessary apparatus, including the means for generating waves of the desired frequency, means for sending them out in pulses of the desired length, and a rotating antenna array driven by a motor 10. The receiver, broadly indicated as 12, is usually connected to the transmitter antenna, which is used as the receiving antenna in the intervals between transmitted signals.

From the receiver connections may lead to the deflector amplifier 14 and to control grid amplifier 15, feeding a suitable cathode ray tube 17 diagrammatically indicated in this instance as of the electrostatic type, in which case a relay 16 may be interposed between the control grid amplifier 15 and the cathode ray tube 17. In case a cathode ray tube of the magnetic deflection type is employed, relay 16 will not be necessary.

For the purpose of permitting the observer to continuously observe any particular sector of the horizon instead of having a panoramic view, I may employ a position-controlling transmitter 20, and this will preferably be associated with the transmitter 11 and operated in synchronism with the antenna array. This transmitter 20 may comprise a rheostat 21 uniformly wound in the form of a ring.

Mounted at the center I may provide a contactor 22, having projections engaging at diametrically opposite points on rheostat 21. The center point of this rheostat may be regarded as neutral and grounded, and between neutral and point 23, at which the arm engages rheostat 21, there may be provided a suitable source of potential, as 25. Similarly, between neutral and the opposite point 24, there may be another source of potential 26, these being equal in magnitude, and so connected that their voltages are cumulative.

The term "opposite" or "opposite points," as used herein with reference to rheostats 21 and 28, means two points so chosen and located on the rheostat that the impedance between them is a maximum. If the impedance of the rheostat before it is closed on itself is X, then any two opposite points will show an impedance between them equal to X/4, and moving either point with respect to the other will reduce the impedance.

If the rheostats are wound uniformly in ring form, as is preferable, then points at the end of any diameter will be opposite points in the sense defined herein.

The voltage between contacts 23 and 24 will always be the total potential difference of the source, and it will be apparent that half way between points 23 and 24 on each side of resistance 21 there will exist two points between which there is no difference of potential. If the arm 22 is synchronized with the rotating transmitter antenna through a mechanical connection (not shown) in such a manner that the directional pointer 27 points the direction in which the signals are beamed, and this arm 27 is at right angles with the arm 22, then one zero point on resistance 21 will always rotate in synchronism with, and have the same bearing as, direction pointer 27; that is, as arms 22 and 27 rotate, being always at right angles to each other, the zero potential point will rotate in synchronism with and 90° displaced from points 23 and 24.

I may now provide at the receiver a second similar resistance 28, and corresponding points of these two resistors may be interconnected as by conductors 30, 31, 32, and 33, the points of connection of conductor 31 being labelled, for example, N for north, those of 33 E for east, those of 32 S for south, and those of 30 W for west. It will now be observed that the potential to ground from each of the points N, E, S, and W, as the arm 22 rotates at a constant rate, is a sine wave, and that each one of these is displaced 90° from the next one. Rheostat 28 may be provided with two contact arms 40 and 41. These are preferably so arranged that they have a fixed angle of 90° between them, and are continuously rotatable as a unit.

Arm 40 may be connected to terminal A and hence to lateral deflection plate 42 of the cathode ray tube 17. One of the vertical deflection plates 45 may then be connected to the deflection amplifier 14. The remaining vertical deflecting plate 44 may be connected to the other lateral deflecting plate 43, to the second anode 6, and to ground. The first anode 47 may be connected to the focus control, or voltage source, as usual, and the control grid 49 may be connected to relay 16. Since this control grid usually has a very high potential difference with respect to ground, of the order of 2,000 volts, and such potential difference cannot be conveniently handled by the output of the control grid amplifier 15, relay 16 is interposed responsive to operation of the amplifier 15 so as to apply a high negative or cutoff potential to the control grid 49, as determined by amplifier 15.

The operation of the system may now be understood. Assume for the moment that the transmitting antenna is stationary and is beamed northwest. Arm 22 will be pointing northeast and southwest, the directional pointer 27 will be pointing northwest, and these arms will remain stationary. As previously pointed out, at a point half way between north and west there will be zero voltage to ground, and the points N and W will be equal in magnitude but of opposite polarity. Consequently points N and W on resistance 28 will be equal in magnitude but of opposite polarity, and at a point half way between north and west on resistance 28 there will be a point of zero potential with respect to ground.

With the setting of arm 40 as indicated; that is, at northwest, the potential of point A and of lateral deflecting plate 42 will be zero with respect to ground, and the cathode ray spot will be laterally centered on the screen.

Suppose now that the transmitting antenna begins to rotate clockwise at a constant speed. It will be apparent that the potential of terminal A will now describe a sine wave, the frequency of which is equal to the frequency of rotation of the arm 22, and hence of the transmitting antenna. This causes the cathode ray beam to deflect, for example, to the right, reaching its maximum deflection at the time the antenna has rotated through 90°, returning to the center at 180°, deflecting to the left to a maximum at 270°, and returning again to the center at 360° rotation.

From this it may be seen that, whatever the bearing of the arm 40, the screen spot will be centered laterally when the transmitting antenna has the same bearing. It will be clear that if the maximum amplitude of the deflection of the cathode ray is less than that required to take it off the screen, the observer will "see" the entire horizon, but if the sweep voltages be adjusted to produce a maximum deflection which is much greater than the screen, then the observer will "see" only a part of the horizon, and the greater the amplitude, the smaller the part he will "see."

To prevent the observer being confused by an indication 180° directionally off from where he wants to see, the voltage derived from point 41 may be applied through terminal B, the amplifier 15, relay 16, to control grid 49. The effect of this is to apply a negative bias cutting off the ray during its return sweep from maximum deflection to the right to maximum deflection to the left.

Stated differently, during the sweep of the directional pointer from southwest to northeast through northwest, the control grid will be biased positively and the ray will be under the control of the deflection plates. During the sweep of the directional pointer 27 from northeast to southwest through southeast, the second half of its cycle, the control grid will be biased negatively and the ray will be cut off.

Thus it will be seen that by setting the arm 40 to any bearing, the observer may see a sector, the center line of which has the same bearing, and the angular width of this sector may be increased or decreased by adjusting the deflecting voltage to control the amount of deflection, the greater the deflection being, the smaller the angle observed. This is shown, for instance, in Fig. 4. Arm 40 is set to a bearing of 315°, it being desired to observe an airplane which has that bearing. The sweep voltages may be adjusted so that the angle observed is 305°–325°, but it will be understood that, by increasing these voltages still further, the angle may be reduced to from 310° to 320°.

If the airplane now travels so that its bearing gradually changes from 315° to 325°, the peak P indicated on the screen will displace itself toward the right, as indicated by the dotted lines, and may eventually reach the edge of the screen. If the observer still wishes to follow this plane, he will now reset the arm 43 to a bearing of 325°, which will move the peak P back to the center of the screen. It will be understood that as many receiving elements 28 and cathode ray tubes 17 may be provided as it is desired to have observers and that each observer may be assigned to a specific object to follow in order to maintain a continuous bearing on it, or each observer may be given a specific angular portion of the horizon to watch continuously.

While I have shown and described certain preferred embodiments of my invention, it will be understood that modifications and changes may be made without departing from the spirit and scope of my invention, as will be apparent to those skilled in the art.

I claim:

1. In a system for controlling the deflection in a cathode ray tube, in combination, a transmitter element comprising an impedance closed upon itself, means for applying a potential difference to said impedance at opposite points, means for changing the points of application of such potential difference while maintaining them at electrically opposite points, a second impedance closed upon itself, a plurality of connections between like points on said impedances, a cathode ray tube, and means for deriving a potential difference from said second impedance and applying it to control the deflection of said cathode ray tube.

2. In a system for controlling the deflection in a cathode ray tube, in combination, a transmitter element comprising an impedance closed upon itself, means for applying a potential difference to said impedance at opposite points, means for changing the points of application of such potential difference while maintaining them at electrically opposite points, a second impedance closed upon itself, a plurality of connections between like points on said impedances, a cathode ray tube, means for deriving a potential difference from said second impedance and applying it to control the deflection of said cathode ray tube, and means for deriving a second potential difference from said second impedance, for biasing the cathode ray on and off.

3. In a system for controlling the deflection in a cathode ray tube, in combination, a transmitter element comprising an impedance closed upon itself, means for applying a potential difference to said impedance at opposite points, means for cyclically changing the points of application of such potential difference while maintaining them at electrically opposite points, a second impedance closed upon itself, a plurality of connections between like points on said impedances, a cathode ray tube, and means for deriving a potential difference from said second impedance and applying it to control the deflection of said cathode ray tube.

4. In a system for controlling the deflection in a cathode ray tube, in combination, a transmitter element comprising an impedance closed upon itself, means for applying a potential difference to said impedance at opposite points, means for changing the points of application of such potential difference while maintaining them at electrically opposite points, a second impedance closed upon itself, a plurality of connections between like points on said impedances, a cathode ray tube, means for deriving a potential difference from said second impedance and applying it to control the deflection of said cathode ray tube, and means for deriving a second potential difference out of phase with said first potential difference from said second impedance, for biasing the cathode ray on and off.

5. Radio detection and ranging apparatus, comrising, in combination, a transmitter including a rotating antenna, a receiver synchronized therewith including a cathode ray tube, a direction indicating transmitting element synchronized with said antenna, having a continuous impedance, rotary means synchronized with said antenna for applying a potential difference at opposite points on said impedance, a second continuous impedance, a plurality of connections between symmetrical points on said impedances, a movable selecting connection to said second impedance, and connections from said selective connection to said cathode ray tube to control the lateral deflection thereof.

6. Radio detection and ranging apparatus, comprising, in combination, a transmitter including a rotating antenna, a receiver synchronized therewith including a cathode ray tube, a direction indicating transmitting element synchronized with said antenna, having a continuous impedance, rotary means synchronized with said antenna for applying a potential difference at opposite points on said impedance, a second continuous impedance, a plurality of connections between symmetrical points on said impedances, a pair of movable selective connections to said second impedance, said connections having a fixed angular relationship, connections from one of said movable connections to said cathode ray tube to control the lateral deflection thereof, and connections from the other of said movable connections to said cathode ray tube to bias the ray on and off.

7. Radio detection and ranging apparatus, comprising, in combination, a transmitter including a rotating antenna, a receiver synchronized therewith including a cathode ray tube, a direction indicating transmitting element synchronized with said antenna, having a continuous impedance, rotary means synchronized with said antenna for applying a potential difference at opposite points on said impedance, a second continuous impedance, a plurality of connections between symmetrical points on said impedances, a pair of movable selective connections to said second impedance, said connections having a fixed angular relationship, such as to provide quadrature phase relation between the voltages from said connections, connections from one of said movable connections to said cathode ray tube to control the lateral deflection thereof, and connections from the other of said movable connections to said cathode ray tube to bias the ray on and off.

8. The method of controlling the deflection in a cathode ray tube in a radio detection and ranging system transmitting signals successively around the horizon and showing the radio echoes of such signals in a cathode ray tube, which comprises applying a potential difference to a closed path, moving the points of application of said potential difference in synchronism with the bearing of transmitted signals, deriving a plurality of potential differences from symmetrical points on said path, impressing said potential differences at corresponding points of a second and similar path, deriving a potential difference between selected points of said second path, and applying said last potential difference to control the lateral deflection of the cathode ray tube.

9. The method of controlling the deflection in a cathode ray tube in a radio detection and ranging system transmitting signals successively around the horizon and showing the radio echoes of such signals in a cathode ray tube, which comprises applying a potential difference to a closed path, moving the points of application of said potential difference in synchronism with the bearing of transmitted signals, deriving a plurality of potential differences from symmetrical points on said path, impressing said potential differences at corresponding points of a second and similar path, deriving a pair of potential differences having a predetermined and fixed phase difference between selected points of said second path, applying one of said potential differences to control the lateral deflection of the cathode ray tube, and applying the other of said potential differences to bias the ray on and off.

MADISON G. NICHOLSON, Jr.